US012800031B2

(12) United States Patent
Weaver

(10) Patent No.: US 12,800,031 B2
(45) Date of Patent: Nov. 17, 2026

(54) SYSTEM FOR MITIGATING BACKLASH OF A CONTROL KNOB

(71) Applicant: Haier US Appliance Solutions, Inc., Wilmington, DE (US)

(72) Inventor: Mark Aaron Weaver, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 308 days.

(21) Appl. No.: 18/436,778

(22) Filed: Feb. 8, 2024

(65) Prior Publication Data

US 2025/0257801 A1 Aug. 14, 2025

(51) Int. Cl.

*F16K 1/02* (2006.01)
*F16K 1/50* (2006.01)
*F24C 3/12* (2006.01)

(52) U.S. Cl.

CPC .................. *F16K 1/02* (2013.01); *F16K 1/50* (2013.01); *F24C 3/126* (2013.01)

(58) Field of Classification Search

CPC ............... F16K 1/02; F16K 1/50; F24C 3/126
USPC ........................................................ 126/39 R
See application file for complete search history.

(56) References Cited

U.S. PATENT DOCUMENTS

| | | | | |
|---|---|---|---|---|
| 6,953,056 B1 * | 10/2005 | Chrisp | ...................... | F16K 1/54 137/625.33 |
| 8,662,102 B2 | 3/2014 | Shaffer et al. | | |
| 10,054,315 B2 | 8/2018 | Choi | | |
| 11,473,779 B2 | 10/2022 | Padgett et al. | | |
| 2007/0012308 A1 * | 1/2007 | Huang | ...................... | F24C 3/12 126/39 N |
| 2007/0125975 A1 | 6/2007 | Jones et al. | | |
| 2010/0264344 A1 * | 10/2010 | Shaffer | .................. | F24C 3/124 251/213 |
| 2021/0116148 A1 * | 4/2021 | Kwak | ...................... | F23N 3/02 |

* cited by examiner

*Primary Examiner* — Avinash A Savani
(74) *Attorney, Agent, or Firm* — Dority & Manning, P.A.

(57) ABSTRACT

A cooking appliance may define a vertical direction, a lateral direction, and a transverse direction. The cooking appliance may include a heating element. The cooking appliance may further include a control valve assembly associated with the heating element. The control valve assembly may include a valve shaft. The valve shaft may include a cylindrical arm defining a first end and a second end. The cylindrical arm may include a tang extended from the first end. The control valve assembly may further include a valve cap. The valve cap may include a circumferential shelf therewithin. The circumferential shelf may include a first pedestal and a second pedestal that together define a wedge slot for receiving the tang. The first pedestal may include an angled pedestal wall.

17 Claims, 8 Drawing Sheets

SYSTEM FOR MITIGATING BACKLASH OF A CONTROL KNOB

FIELD OF THE DISCLOSURE

The present subject matter relates generally to a control knob, and more particularly, to a control knob for a cooking appliance.

BACKGROUND OF THE DISCLOSURE

Gas cooktops generally include a plurality of gas burners for heating cooking utensils and food items within the cooking utensils. Certain gas cooktops include manual control valves that allow a user of the gas cooktops to adjust or regulate operation of the gas burners. For example, turning a control knob attached to a shaft of the manual control valve in a first direction increases gas fuel flow to the gas burner and thereby increases a heat output of the associated gas burner. Conversely, turning the knob of the manual control valve in a second, opposite direction decreases gas fuel flow to the gas burner and thereby decreases a heat output of the associated gas burner.

In some instances, control knobs for gas cooktops can have excessive rotary backlash, or free rotation, of the control knob. Excessive rotary backlash of the control knob can often be caused by the fitment between various components of the manual control valve. For example, the shaft of the manual control valve may be coupled to a valve cap of the manual control valve. Any looseness in fit between the shaft and the valve cap can be amplified and result in excessive rotary backlash of the control knob.

Accordingly, a system that obviates one or more of the above drawbacks would be useful.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a cooking appliance is provided. The cooking appliance may define a vertical direction, a lateral direction, and a transverse direction. The cooking appliance may include a heating element. The cooking appliance may also include a control valve assembly associated with the heating element. The control valve assembly may include a valve shaft. The valve shaft may include a cylindrical arm defining a first end and a second end. The cylindrical arm may include a tang extended from the first end. The control valve assembly may also include a valve cap including a circumferential shelf therewithin. The circumferential shelf may include a first pedestal and a second pedestal that together define a wedge slot for receiving the tang. The first pedestal may include an angled pedestal wall.

In another exemplary aspect of the present disclosure, a control valve assembly for a gas burner is provided. The control valve assembly may define a vertical direction, a lateral direction, and a transverse direction. The control valve assembly may include a valve shaft including a cylindrical arm defining a first end and a second end. The cylindrical arm may include a tang extended from the first end. The control valve assembly may also include a stepped valve cap including a circumferential shelf therewithin. The circumferential shelf may include a first pedestal and a second pedestal spaced circumferentially apart that define a wedge slot for receiving the tang. The first pedestal may include an angled pedestal wall. The first pedestal may define a first extension. The second pedestal may define a second extension. The first extension may be greater than the second extension.

In yet another exemplary aspect of the present disclosure, a control valve assembly for a gas burner is provided. The control valve assembly may define a vertical direction, a lateral direction, and a transverse direction. The control valve assembly may include a valve shaft including a cylindrical arm defining a first end and a second end. The cylindrical arm may include a tang extended from the first end. The control valve assembly may also include a stepped valve cap including a circumferential shelf therewithin. The circumferential shelf may include a first pedestal and a second pedestal spaced circumferentially apart that define a wedge slot for receiving the tang. The second pedestal may include an angled pedestal wall. The first pedestal may define a first extension. The second pedestal may define a second extension. The first extension may be greater than the second extension.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
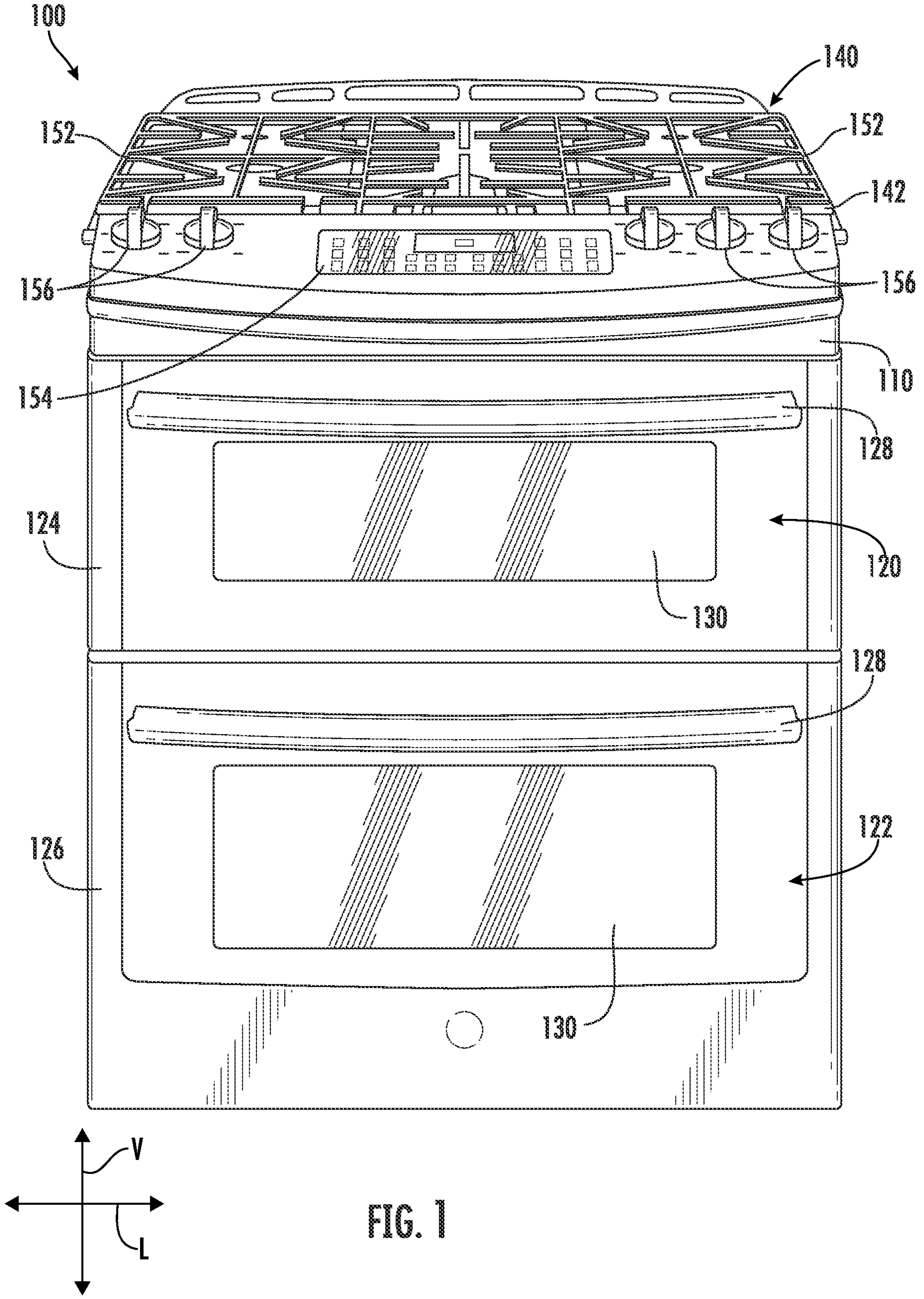
FIG. 1 provides a front, perspective view of a cooking appliance according to one or more exemplary aspects of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Exemplary aspects of the present subject matter are directed to systems for preventing, restricting, or mitigating rotary backlash for a control knob of a cooking appliance, such as when the control knob is in an off position. Typically, a control valve assembly is associated with the control knob. The control valve assembly can include a valve body, a valve shaft, a valve cone, and a valve cap. The valve cap may be mounted to the valve body to hold the valve cone within the valve body. Additionally, the valve shaft can extend through the valve cap and be coupled to the control knob. In exemplary embodiments of the present subject matter the valve cap can define a slot configured to receive a tang extended from the valve shaft. Specifically, embodiments of the present subject matter advantageously provide a wedged-shaped tang and a complementary wedge-shaped slot that together mitigate rotary backlash of the associated control knob. Moreover, the wedged-shaped tang and the complementary wedged-shaped slot may be configured to maintain push to turn forces of the control knob. In this regard, a user may be prevented from turning the knob prior to pushing it in.

Figure 2:
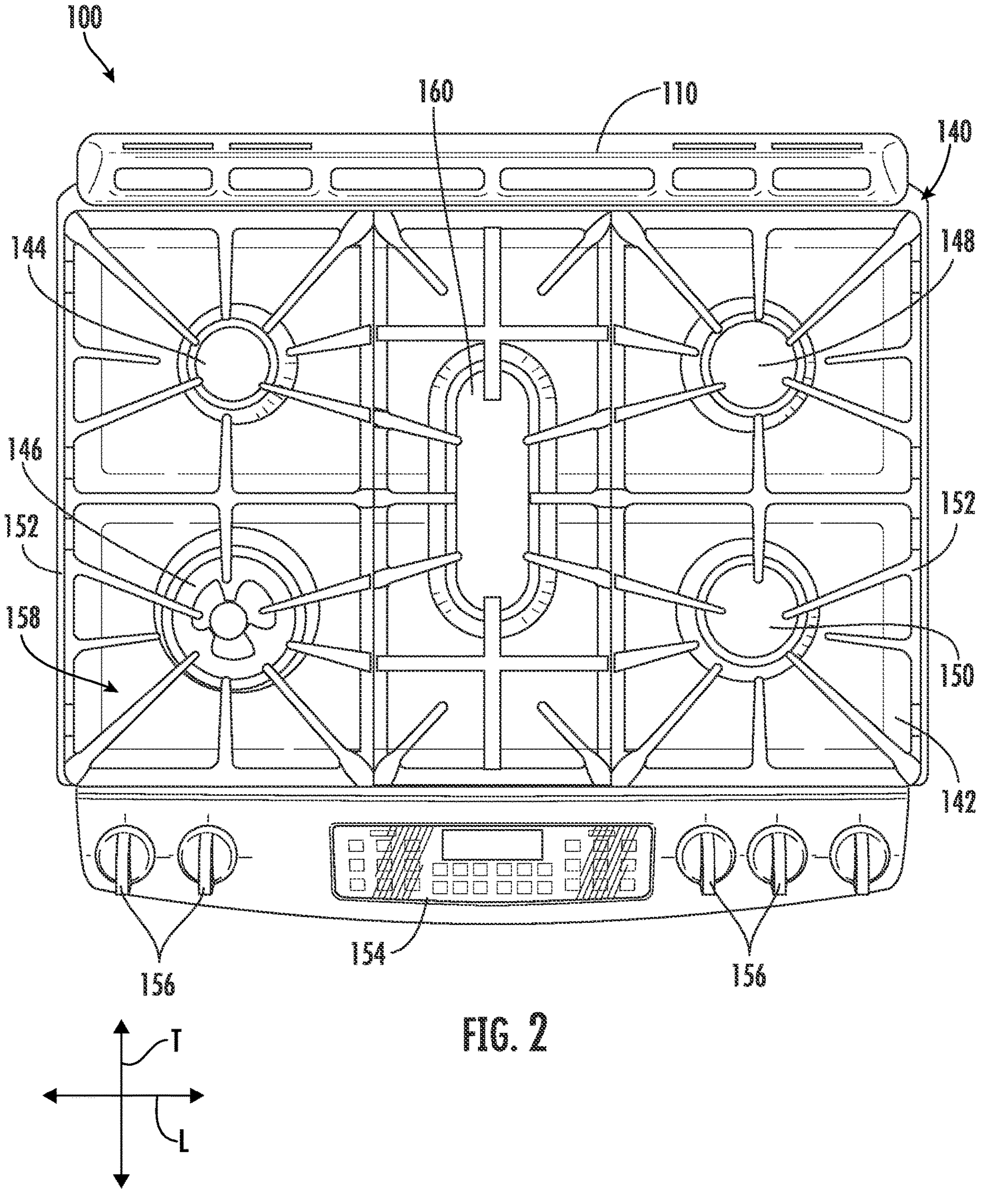
FIG. 2 provides a top, plan view of the exemplary cooking appliance of FIG. 1.
Figure 3:
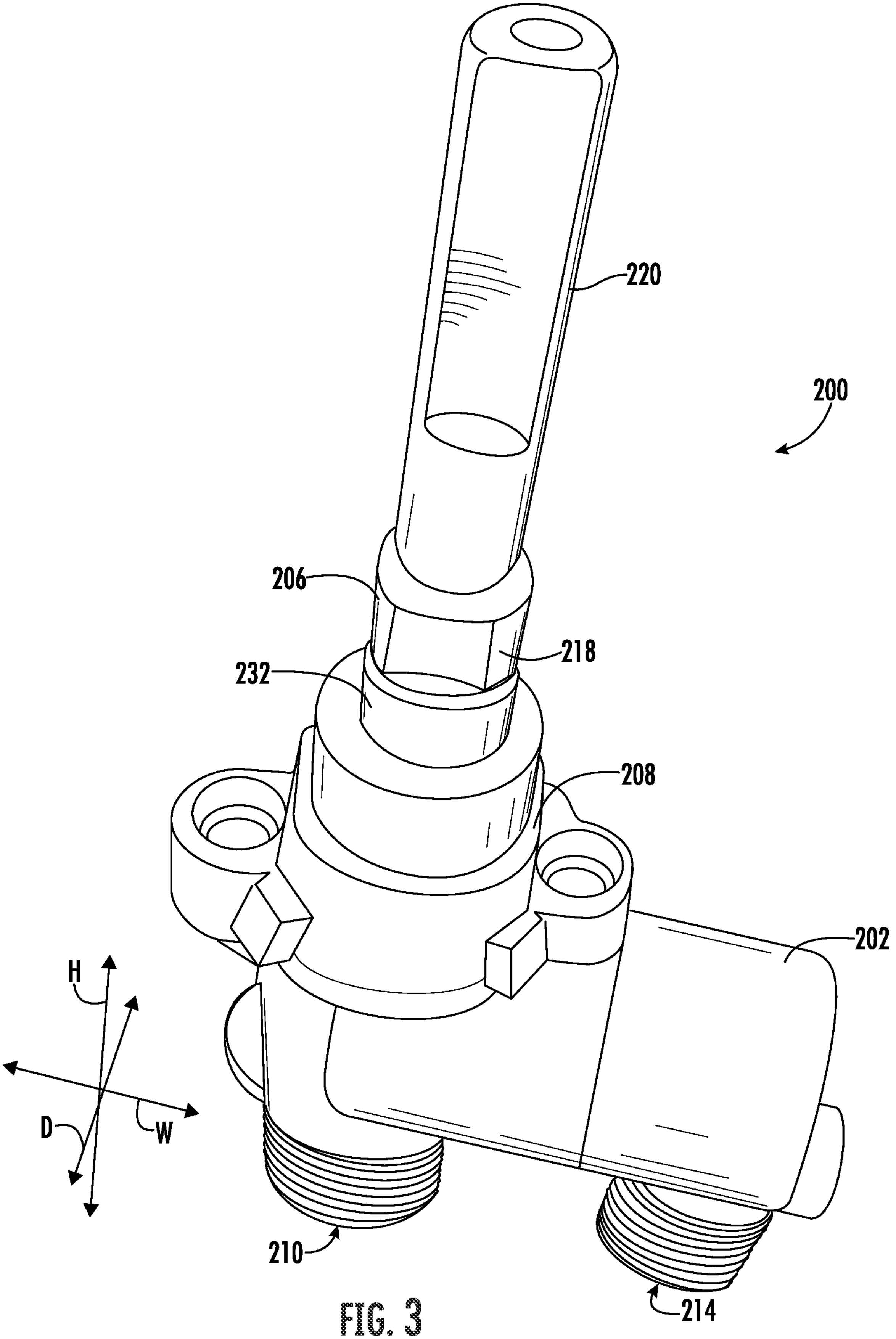
FIG. 3, provides a perspective view of a control valve assembly according to one or more exemplary aspects of the present subject matter.
Figure 4:
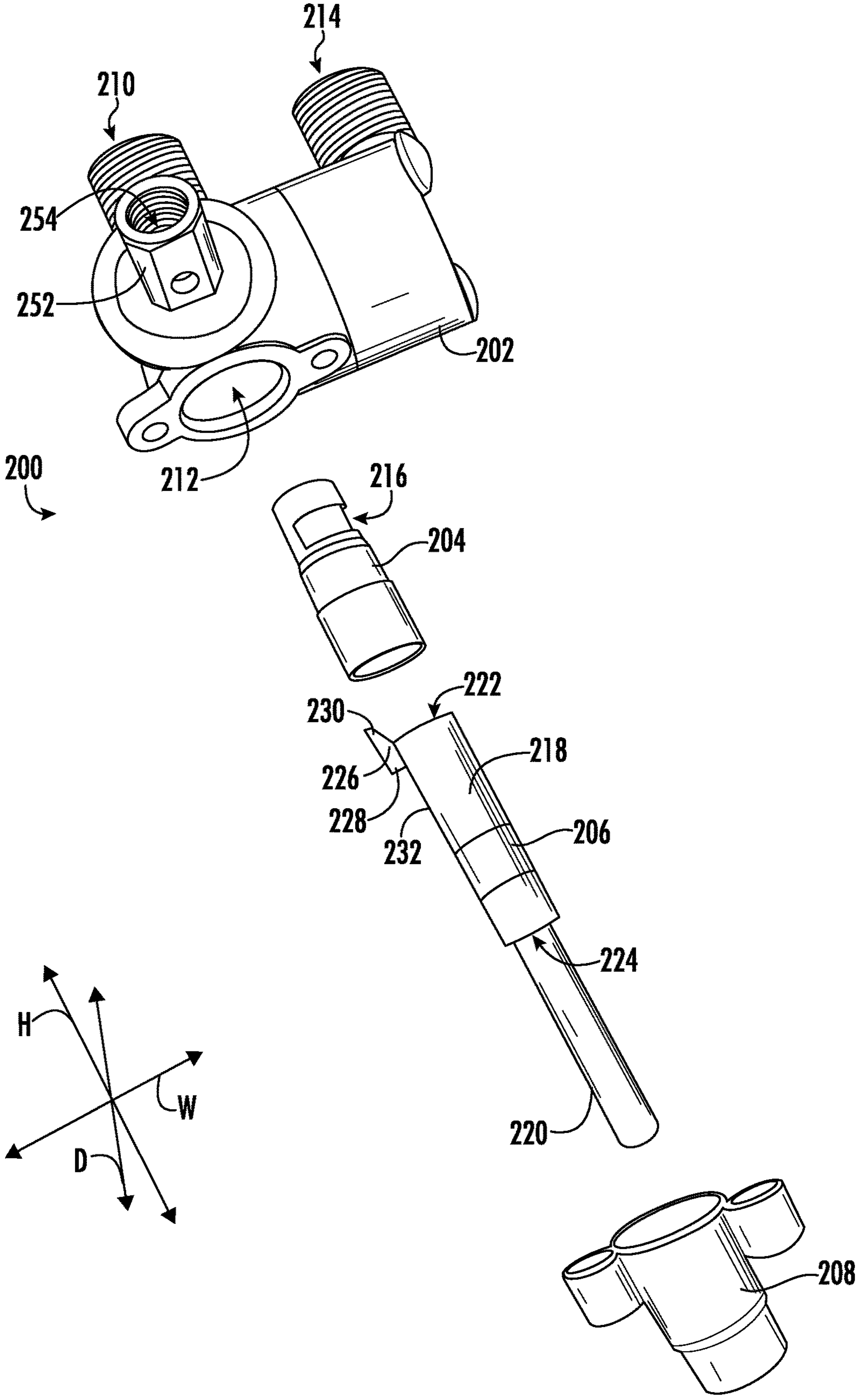
FIG. 4 provides an exploded view of the control valve assembly of FIG. 3.
Figure 5:
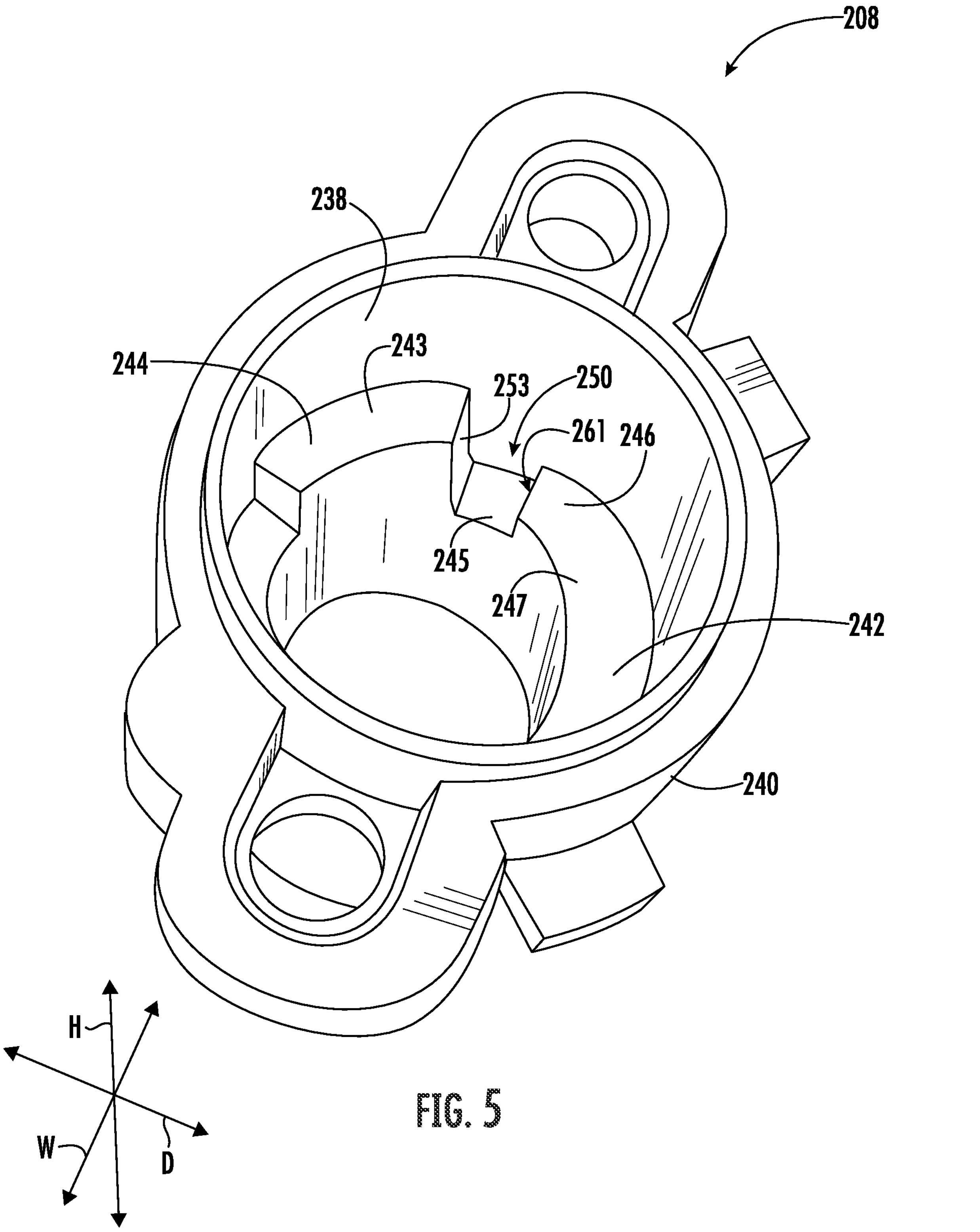
FIG. 5 provides a perspective view of a valve cap according to one or more exemplary aspects of the present subject matter.
Figure 6:
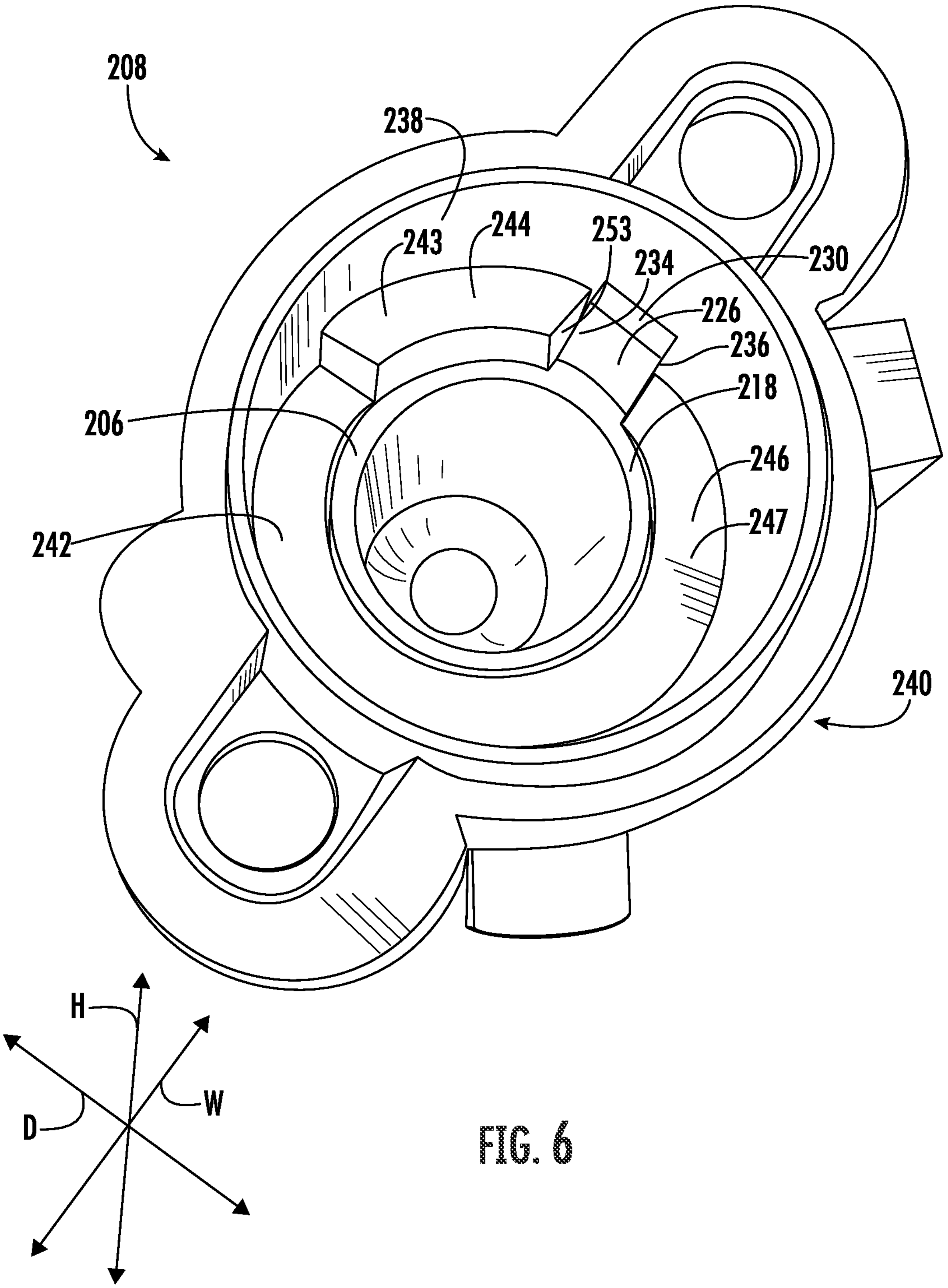
FIG. 6 provides a perspective view of a valve cap and a valve stem according to one or more exemplary aspects of the present subject matter.

Turning now to the figures, FIG. 1 provides a front, perspective view of a cooking appliance 100 as may be employed with the present disclosure. FIG. 2 provides a top, plan view of cooking appliance 100. Cooking appliance 100 includes an insulated cabinet 110. Cabinet 110 defines an upper cooking chamber 120 and a lower cooking chamber 122. Thus, cooking appliance 100 is generally referred to as a double oven cooking appliance. As will be understood by those skilled in the art, cooking appliance 100 is provided by way of example only, and the present disclosure may be used in any suitable appliance (e.g., a single oven cooking appliance, an electric cooking appliance, or a standalone cooktop appliance). Thus, the exemplary embodiment shown in FIG. 1 is not intended to limit the present disclosure to any particular cooking chamber configuration or arrangement.

Upper and lower cooking chambers 120 and 122 are configured for the receipt of one or more food items to be cooked. Cooking appliance 100 includes an upper door 124 and a lower door 126 rotatably attached to cabinet 110 in order to permit selective access to upper cooking chamber 120 and lower cooking chamber 122, respectively. Handles 128 are mounted to upper and lower doors 124 and 126 to assist a user with opening and closing doors 124 and 126 in order to access cooking chambers 120 and 122. As an example, a user can pull on handle 128 mounted to upper door 124 to open or close upper door 124 and access upper cooking chamber 120. Glass windowpanes 130 provide for viewing the contents of upper and lower cooking chambers 120 and 122 when doors 124 and 126 are closed and also assist with insulating upper and lower cooking chambers 120 and 122. Heating elements (not shown), such as electric resistance heating elements, gas burners, microwave heating elements, halogen heating elements, or suitable combinations thereof, are positioned within upper cooking chamber 120 and lower cooking chamber 122 for heating upper cooking chamber 120 and lower cooking chamber 122.

Cooking appliance 100 also includes a cooktop 140. Cooktop 140 is positioned at or adjacent a top portion of cabinet 110. Thus, cooktop 140 is positioned above upper and lower cooking chambers 120 and 122. Cooktop 140 includes a top panel 142. By way of example, top panel 142 may be constructed of glass, ceramics, enameled steel, and combinations thereof. Moreover, top panel 142 may be formed as a unitary, single piece or, alternatively, as multiple discrete pieces joined together.

For cooking appliance 100, a utensil holding food or cooking liquids (e.g., oil, water, etc.) may be placed onto grates 152 at a location of any of burner assemblies 144, 146, 148, 150. Burner assemblies 144, 146, 148, 150 provide thermal energy to cooking utensils on grates 152. As shown in FIG. 1, burners assemblies 144, 146, 148, 150 can be configured in various sizes so as to provide, for example, for the receipt of cooking utensils (e.g., pots, pans, etc.) of various sizes and configurations and to provide different heat inputs for such cooking utensils. Grates 152 may be supported on a top surface 158 of top panel 142. In optional embodiments, cooking appliance 100 includes a griddle burner 160 positioned at a middle portion of top panel 142, as may be seen in FIG. 2. A griddle may be positioned on grates 152 and heated with griddle burner 160.

A user interface panel 154 is located within convenient reach of a user of the cooking appliance 100. For this exemplary embodiment, user interface panel 154 includes control knobs 156 that are each associated with one of burner assemblies 144, 146, 148, 150 and griddle burner 160. Control knobs 156 allow the user to activate each burner assembly and determine the amount of heat input provided by each burner assembly 144, 146, 148, 150 and griddle burner 160 to a cooking utensil located thereon. User interface panel 154 may also be provided with one or more graphical display devices that deliver certain information to the user such as, for example, whether a particular burner assembly is activated or the rate at which the burner assembly is set.

Although shown with control knobs 156, it should be understood that control knobs 156 and the configuration of cooking appliance 100 shown in FIG. 1 is provided by way of example only. More specifically, user interface panel 154 may include various input components, such as one or more of a variety of touch-type controls, electrical, mechanical or electro-mechanical input devices including rotary dials, push buttons, and touch pads. The user interface panel 154 may include other display components, such as a digital or analog display device designed to provide operational feedback to a user.

Referring now to FIGS. 3 through 7, a control valve assembly 200 and components thereof are provided according to one or more exemplary embodiments of the present subject matter. Generally, the control valve assembly 200 may be used in cooking appliance 100 to regulate gas fuel flow to one or more of the burner assemblies 144, 146, 148, 150 or griddle burner 160. For instance, each one of the burner assemblies 144, 146, 148, 150 or griddle burner 160 may be associated with a discrete control valve assembly 200 to regulate gas fuel flow. Moreover, the control valve assembly 200 may be coupled to a control knob 156 associated with the burner assemblies 144, 146, 148, 150 or griddle burner 160. In this regard, a user of the cooking appliance 100 can rotate the control knob 156 to regulate gas fuel flow, as will be discussed in more detail below.

The control valve assembly 200 may define a vertical direction H, a lateral direction W, and a transverse direction D. It should be noted that the coordinates defined herein apply to control valve assembly 200 and may or may not be equivalent to the vertical direction V, lateral direction L, and transverse direction T defined by cooking appliance 100. In some instances, the control valve assembly 200 may be positioned within cooking appliance 100 in a tilted manner, such that vertical direction H of the control valve assembly 200 is provided at an acute angle with respect to the vertical direction V of cooking appliance 100.

The control valve assembly 200 may generally include a valve body 202, a valve cone 204 (e.g., FIG. 4), a valve shaft 206, and a stepped valve cap 208. In some embodiments, the valve body 202 defines an inlet conduit 210, a valve chamber 212 (e.g., FIG. 4), and an outlet conduit 214. The inlet conduit 210 may be configured for receiving a flow of gaseous fuel and directing the flow of gaseous fuel into the valve chamber 212 defined by the valve body 202. From the valve chamber 212, the flow of gaseous fuel can exit the valve body 202 at the outlet conduit 214. The outlet conduit 214 may be engaged with a gas fuel line of one of the burner assemblies 144, 146, 148, 150 or griddle burner 160.

A flow rate of the gaseous fuel through the valve chamber 212 may be regulated with the valve cone 204. For instance, the valve cone 204 may be positioned within valve chamber 212 to regulate gaseous fuel flow through the valve chamber 212. In particular, a cross-sectional area of valve cone 204 in a plane that is perpendicular to the lateral direction W may correspond to or match (e.g., be slightly less than) a cross-sectional area of valve chamber 212 in the plane that is perpendicular to the lateral direction W. Thus, gas fuel flowing into valve chamber 212 may flow through valve cone 204 to outlet conduit 214 of valve body 202 rather than around valve cone 204 within valve chamber 212 of valve body 202.

Valve cone 204 is configured to rotate within valve chamber 212 of valve body 202. Rotation of valve cone 204 within valve chamber 212 adjusts a position of slot 216 of valve cone 204 relative to inlet conduit 210. In such a manner, the flow of gaseous fuel through control valve assembly 200 is regulated or controlled. In particular, more gaseous fuel may flow through valve body 202 when slot 216 of valve cone 204 is aligned with inlet conduit 210 of valve body 202. Conversely, less gaseous fuel may flow through valve body 202 when slot 216 of valve cone 204 is not aligned with inlet conduit 210 of valve body 202, e.g., such as when other portions of slot 216 are aligned with inlet conduit 210 of valve body 202.

Further, the valve body 202 may include a mounting bracket 252 mounted thereto. The mounting bracket 252 may be integrally formed with valve body 202 such that mounting bracket 252 and valve body 202 are formed of a single continuous piece of material, such as a metal or plastic. Mounting bracket 252 is configured for receiving and coupling to a gaseous fuel manifold, such as steel tubing. To assist with securing the gaseous fuel manifold to mounting bracket 252, mounting bracket 252 defines a fastener hole 254. A fastener may extend into fastener hole 254 to or into the gaseous fuel manifold. Thus, fastener may engage mounting bracket 252 and the gaseous fuel manifold in order to secure the gaseous fuel manifold to mounting bracket 252.

The valve shaft 206 may include a cylindrical arm 218 and a valve stem 220. The cylindrical arm 218 may define a first end 222 and a second end 224 spaced apart approximately along the vertical direction H. A tang 226 may be extended from the first end 222 of the cylindrical arm 218. The tang 226 may include a first body 228 and a second body 230. The first body 228 being extended outward from an outer wall 232 of the cylindrical arm 218 approximately along a first direction (e.g., the lateral direction W). The second body 230 extended from the first body 228 approximately along a second direction (e.g., the vertical direction H). The first direction may be approximately perpendicular to the second direction such that the first body 228 and the second body 230 may form a right angle. Furthermore, the first body 228 and the second body 230 of the tang 226 may together form a first angled side 234 and a second side 236 (e.g., FIG. 7). In this regard, the first body 228 and the second body 230 may together form a wedge-shaped end 229 for the tang 226 (e.g., FIG. 7). As will be appreciated in more detail below, the wedge-shaped end 229 of the tang 226 may advantageously help prevent, restrict, or mitigate rotary backlash, or free rotation, of a control knob (e.g., control knob 156) in an off position.

The valve stem 220 may be extended from the second end 224 of the cylindrical arm 218. The valve stem 220 may be coupled to a respective control knob 156. A user may rotate the valve stem 220 (e.g., indirectly via manipulation of the control knob 156) in order to rotate the valve cone 204 within the valve chamber 212 defined by the valve body 202. In this regard, a user may regulate a flow of gaseous fuel to an associated burner assembly, e.g., as discussed in more detail above.

The stepped valve cap 208 may generally include an outer wall 238 and an inner wall 240. The inner wall 240 may include a circumferential shelf 242 that forms a surface for the wedge-shaped end 229 of the tang 226 to interface with. For instance, the circumferential shelf 242 may include a first pedestal 244 and a second pedestal 246 that together define a wedge slot 250 for receiving the wedge-shaped end 229 of the tang 226. The first pedestal 244 may define a first extension 248 and the second pedestal 246 may define a second extension 251. In some embodiments, the first extension 248 is measured from a top surface 243 of the first pedestal 244 to a bottom surface 245 of the wedge slot 250. Further, in some embodiments, the second extension 251 is measured from a top surface 247 of the second pedestal 246 to the bottom surface 245 of the wedge slot 250. In some embodiments the first extension 248 defined by the first pedestal 244 is greater than the second extension 251 defined by the second pedestal 246. For example, the first extension 248 may be at least approximately one and a half times greater than the second extension 251, such as approximately two times greater, such as approximately three times greater.

Further, the first pedestal 244 may include an angled pedestal wall 253. The angled pedestal wall 253 may include an angled surface that may complement the wedge-shaped end 229 of the tang 226. In some embodiments, the angled pedestal wall 253 may be defined by a predetermined angle 256 (see e.g., FIG. 7). The predetermined angle 256 may be any suitable angle that may facilitate an interference fit or friction fit between the wedge-shaped end 229 of the tang 226 and the wedge slot 250. For example, the predetermined angle 256 may be approximately twenty degrees (20°) to approximately forty-five degrees (45°) relative to the vertical direction H.

Figure 7:
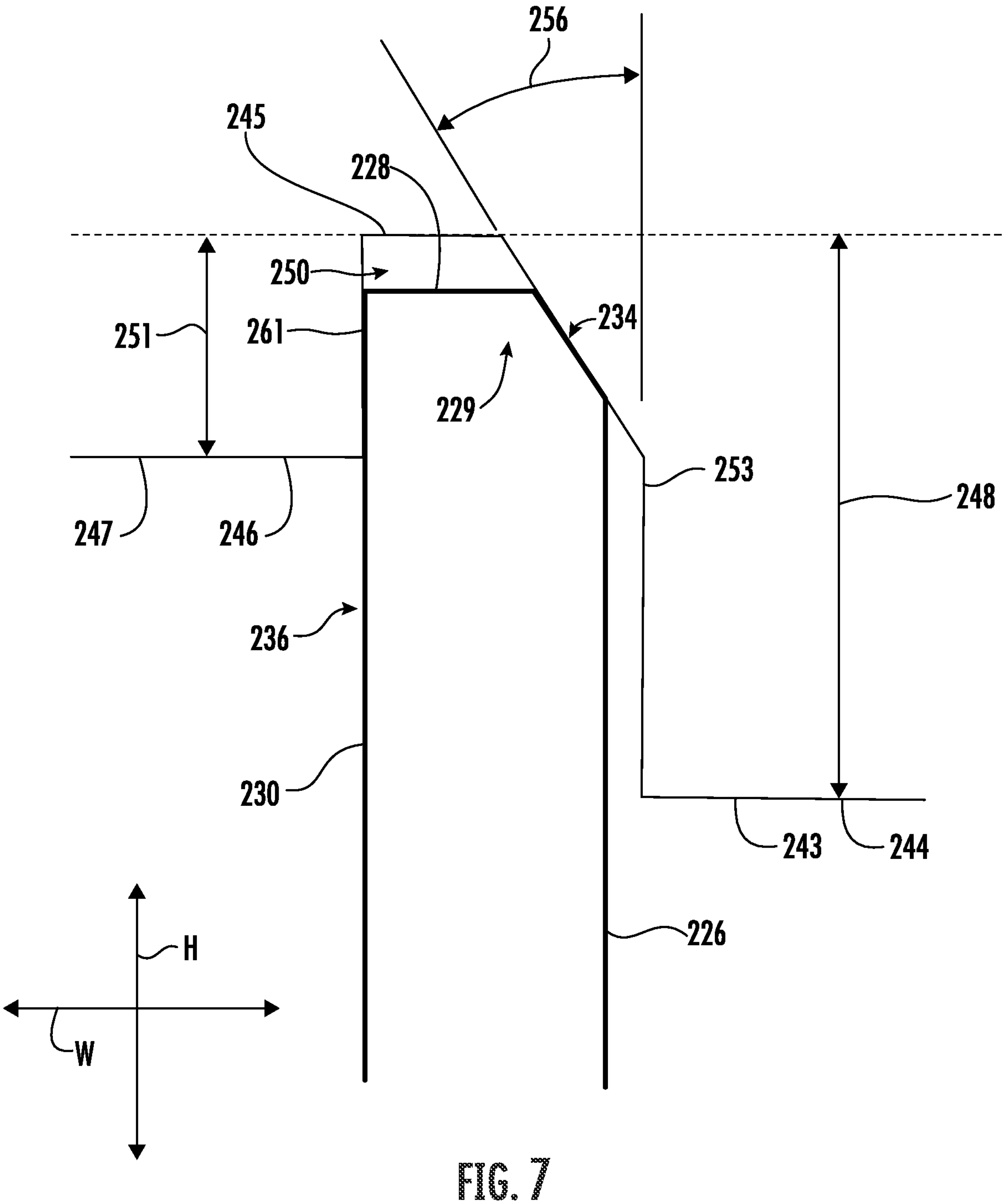
FIG. 7 provides a cross-sectional view of a slot of a valve cap and a tang of a valve stem according to one or more exemplary aspects of the present subject matter.

In some embodiments, the control knob 156 utilizes a push to turn feature. The push to turn feature may require a user to push the control knob 156 in (e.g., toward the user interface panel 154) prior to rotating or turning the control knob 156 (e.g., to regulate the gas fuel flow). When the control knob 156 is in the off position (e.g., prior to the control knob 156 being rotated) the tang 226 may be positioned within the wedge slot 250. For instance, the first angled side 234 of the tang 226 may advantageously be interfaced with the angled pedestal wall 253 of the first pedestal 244 and the second side 236 of the tang 226 may be interfaced with a first wall 261 of the second pedestal 246 prior to the tang 226 being interfaced with the bottom surface 245 of the wedge slot 250. In this regard, the tang 226 may advantageously form a friction fit with the angled pedestal wall 253 of the first pedestal 244 and the first wall 261 of the second pedestal 246. Further, when the tang 226 is positioned within the wedge slot 250, e.g., as illustrated in FIG. 7, the friction fits between the tang 226, the first pedestal 244, or the second pedestal 246 may advantageously “wedge” the tang 226 within the wedge slot 250. As a result rotary backlash of the control knob 156 in the off position may be prevented or mitigated as the tang 226 may be secured within the wedge slot 250.

Furthermore, the predetermined angle 256 may be configured such that suitable push to turn forces may be maintained. For example, the predetermined angle 256 may configured such that the tang 226 does not “stick” within the wedge slot 250 when a push to turn force is applied to the control knob 156. In this regard, the predetermined angle 256 may still allow a user to push in the control knob with a suitable amount of force that may be known to one of ordinary skill in the art.

Further, when the control knob 156 is pushed in, the tang 226 may become free from the wedge slot 250. Once the tang 226 is free from the wedge slot 250, the control knob 156, and in turn, valve shaft 206 may be capable of rotating (e.g., rotating clockwise) to regulate the gas fuel flow as described in more detail above.

Alternatively, in some embodiments, the second pedestal 246 may include an angled pedestal wall. For example, referring now to FIG. 8, a schematic view of a portion of a controller valve assembly 300 according to one or more exemplary aspects of the present disclosure is provided. The exemplary control valve assembly 300 of FIG. 8 may be configured in substantially the same manner as the exemplary control valve assembly 200 of FIG. 7, and accordingly, the same or similar numbers may refer to the same or similar parts.

Figure 8:
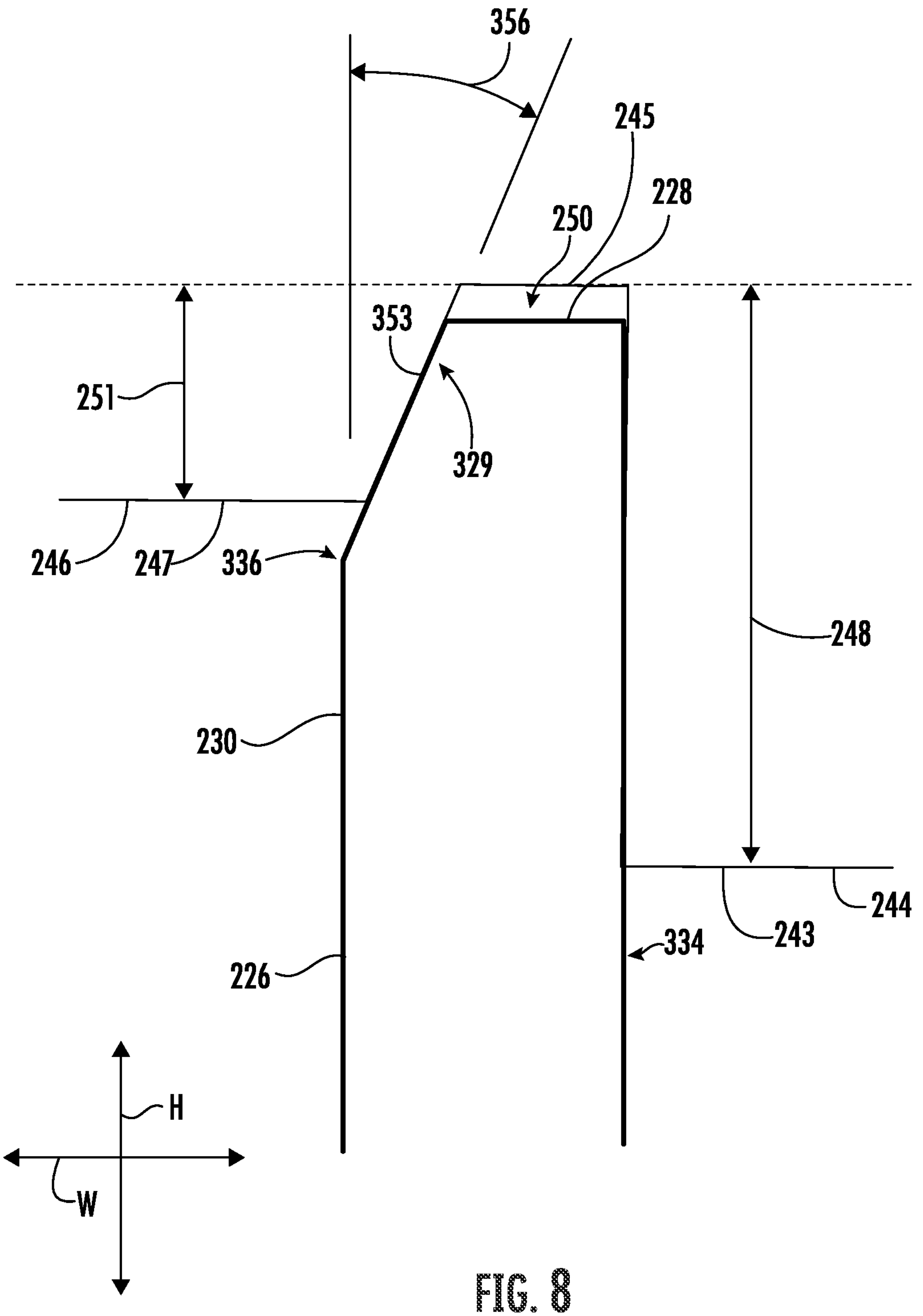
FIG. 8 provides a cross-sectional view of an alternative slot of a valve cap and a tang of a valve stem according to one or more exemplary aspects of the present subject matter.

For example, the exemplary control valve assembly 300 of FIG. 8 generally includes a stepped valve cap 208 that includes circumferential shelf 242. The circumferential shelf 242 of FIG. 8 generally includes a first pedestal 244 and a second pedestal 246 that are spaced circumferentially apart to define a wedge slot 250. The first pedestal 244 may define a first extension 248 and the second pedestal 246 may define a second extension 251. In some embodiments, the first extension 248 is measured from a top surface 243 of the first pedestal 244 to a bottom surface 245 of the wedge slot 250. Further, in some embodiments, the second extension 251 is measured from a top surface 247 of the second pedestal 246 to the bottom surface 245 of the wedge slot 250. In addition, the control valve assembly 300 of FIG. 8 includes a valve shaft 206 and a tang 226 extended from a first end 222 of the valve shaft 206.

However, for the embodiment of FIG. 8, the second pedestal 246 may include an angled pedestal wall 353. Additionally, for the embodiment of FIG. 8, the tang 226 may include a first side 334 and an angled second side 336. The angled pedestal wall 353 may include an angled surface that may complement a wedge-shaped end 329 of the tang 226. In some embodiments, the angled pedestal wall 353 may be defined by a predetermined angle 356. The predetermined angle 356 may be any suitable angle that may facilitate an interference fit or friction fit between the wedge-shaped end of the tang 226 and the wedge slot 250. For example, the predetermined angle 256 may be approximately ten degrees (10°) to approximately thirty degrees (30°) to the vertical direction H. Moreover, the predetermined angle 256 may be configured such that suitable push to turn forces may be maintained. That is, the predetermined angle 356 may still allow a user to push in the control knob with a suitable amount of force.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance defining a vertical direction, a lateral direction, and a transverse direction, the cooking appliance comprising:

a heating element;

a control valve assembly associated with the heating element, the control valve assembly comprising:

a valve shaft comprising a cylindrical arm defining a first end and a second end, the cylindrical arm comprising a tang extended from the first end, wherein the tang comprises a first body and a second body, wherein the first body is extended from an outer wall of the cylindrical arm in a first direction, wherein the second body is extended from the first body in a second direction, and wherein the second direction is approximately perpendicular to the first direction; and a valve cap comprising a circumferential shelf therewithin, the circumferential shelf comprising a first pedestal and a second pedestal that together define a wedge slot for receiving the tang, the first pedestal comprising an angled pedestal wall.

2. The cooking appliance of claim 1, wherein the first body and the second body together form a first angled side and a second side.

3. The cooking appliance of claim 2, wherein the first angled side is interfaced with the angled pedestal wall when the control valve assembly is in an off position to mitigate rotary backlash of the control valve assembly in the off position.

4. The cooking appliance of claim 1, wherein the first pedestal defines a first extension from a bottom surface of the wedge slot to a top surface of the first pedestal, wherein the second pedestal defines a second extension from the bottom surface of the wedge slot to the top surface of the pedestal wall, and wherein the first extension is greater than the second extension.

5. The cooking appliance of claim 1, wherein the angled pedestal wall of the first pedestal is defined by a predetermined angle of approximately twenty degrees to approximately forty-five degrees relative to the vertical direction.

6. The cooking appliance of claim 1, wherein the valve shaft further comprises a valve stem, wherein the valve stem is extended from the second end of the cylindrical arm, and wherein the valve stem is coupled to a control knob of the cooking appliance.

7. A control valve assembly for a gas burner, the control valve assembly defining a vertical direction, a lateral direction, and a transverse direction, the control valve assembly comprising:

a valve shaft comprising a cylindrical arm defining a first end and a second end, the cylindrical arm comprising a tang extended from the first end; and a stepped valve cap comprising a circumferential shelf therewithin, the circumferential shelf comprising a first pedestal and a second pedestal spaced circumferentially apart that define a wedge slot for receiving the tang, the first pedestal comprising an angled pedestal wall, wherein the tang comprises a first body and a second body, wherein the first body is extended from an outer wall of the cylindrical arm in a first direction, and wherein the second body is extended from the first body in a second direction, and wherein the second direction is approximately perpendicular to the first direction, wherein the first pedestal defines a first extension, wherein the second pedestal defines a second extension, and wherein the first extension is greater than the second extension.

8. The control valve assembly of claim 7, wherein the first body and the second body together form a first angled side and a second side.

9. The control valve assembly of claim 8, wherein the first angled side is interfaced with the angled pedestal wall when the control valve assembly is in an off position to mitigate rotary backlash of the control valve assembly in the off position.

10. The control valve assembly of claim 7, wherein the first extension is measured from a bottom surface of the wedge slot to a top surface of the first pedestal, and wherein the second extension is measured from the bottom surface of the wedge slot to the top surface of the pedestal wall.

11. The control valve assembly of claim 7, wherein the angled pedestal wall is defined a predetermined angle of approximately twenty degrees to approximately forty-five degrees relative to the vertical direction.

12. The control valve assembly of claim 7, wherein the valve shaft further comprises a valve stem, and wherein the valve stem is extended from the second end of the cylindrical arm.

13. A control valve assembly for a gas burner, the control valve assembly defining a vertical direction, a lateral direction, and a transverse direction, the control valve assembly comprising:

a valve shaft comprising a cylindrical arm defining a first end and a second end, the cylindrical arm comprising a tang extended from the first end; and a stepped valve cap comprising a circumferential shelf therewithin, the circumferential shelf comprising a first pedestal and a second pedestal spaced circumferentially apart that define a wedge slot for receiving the tang, the second pedestal comprising an angled pedestal wall, wherein the tang comprises a first body and a second body, wherein the first body is extended from an outer wall of the cylindrical arm in a first direction, and wherein the second body is extended from the first body in a second direction, wherein the second direction is approximately perpendicular to the first direction, wherein the first pedestal defines a first extension, wherein the second pedestal defines a second extension, and wherein the first extension is greater than the second extension.

14. The control valve assembly of claim 13, wherein the first body and the second body together form a first side and a second angled side.

15. The control valve assembly of claim 14, wherein the second angled side is interfaced with the angled pedestal wall when the control valve assembly is in an off position to mitigate rotary backlash of the control valve assembly in the off position.

16. The control valve assembly of claim 13, wherein the angled pedestal wall of the second pedestal is defined by a predetermined angle of approximately ten degrees to approximately thirty degrees relative to the vertical direction.

17. The control valve assembly of claim 13, wherein the valve shaft further comprises a valve stem, and wherein the valve stem is extended from the second end of the cylindrical arm.

* * * * *